United States Patent
VanDeVyvere et al.

(10) Patent No.: US 6,454,237 B1
(45) Date of Patent: Sep. 24, 2002

(54) AIR ACTIVATED INTERNAL VALVE

(75) Inventors: Bryan VanDeVyvere, Lee's Summit; Robert David Weichers, Kansas City, both of MO (US); Brent Stewart Hanson, Olathe, KS (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/698,908

(22) Filed: Oct. 27, 2000

(51) Int. Cl.[7] ................... F16K 31/122; F16K 15/00
(52) U.S. Cl. ................... 251/28; 137/102; 251/63.6; 251/144
(58) Field of Search .............. 251/63.6, 144, 251/63.5, 62, 14, 28, 29; 137/102

(56) References Cited

U.S. PATENT DOCUMENTS

| | | | | |
|---|---|---|---|---|
| 2,019,786 A | * | 11/1935 | Jurs | 251/63.6 |
| 2,442,625 A | * | 6/1948 | Thomas | 251/14 |
| 2,726,840 A | * | 12/1955 | Jurs et al. | 251/63.6 |
| 3,252,472 A | * | 5/1966 | Natho | 251/29 X |
| 3,392,956 A | * | 7/1968 | De Frees | 251/144 |
| 3,910,551 A | * | 10/1975 | DeFrees | 251/144 |
| 4,009,862 A | * | 3/1977 | DeFrees | 251/144 X |
| 4,406,299 A | * | 9/1983 | DeFrees | 251/28 X |
| 4,934,403 A | * | 6/1990 | Mooney et al. | 251/144 X |
| 5,244,181 A | * | 9/1993 | VanDeVyvere | 251/144 |

* cited by examiner

Primary Examiner—Lesley D. Morris
Assistant Examiner—John Bastianelli
(74) Attorney, Agent, or Firm—Jones, Walker, Waechter, Poitevent, Carrere & Denegre, L.L.P.

(57) ABSTRACT

An air actuated internal valve for a cargo container. The valve generally includes a valve base having a valve disk seat and a line connector extending therefrom. A valve stem having a first end is fixed to the valve base and a valve disk is slidingly mounted on the valve stem. A cylinder assembly is connected to the valve disk and a piston is positioned within the cylinder assembly and fixed to a second end of the valve stem. An air passage communicates through the base and the valve stem in order to provide air to an air space between the piston and a top internal portion of the cylinder assembly. When pressurized air is introduced into the air passage, the cylinder assembly (and thus the valve disk) moves upward, unseating the valve disk from the valve seat. This opens the valve and allows fluid to flow there through.

5 Claims, 4 Drawing Sheets

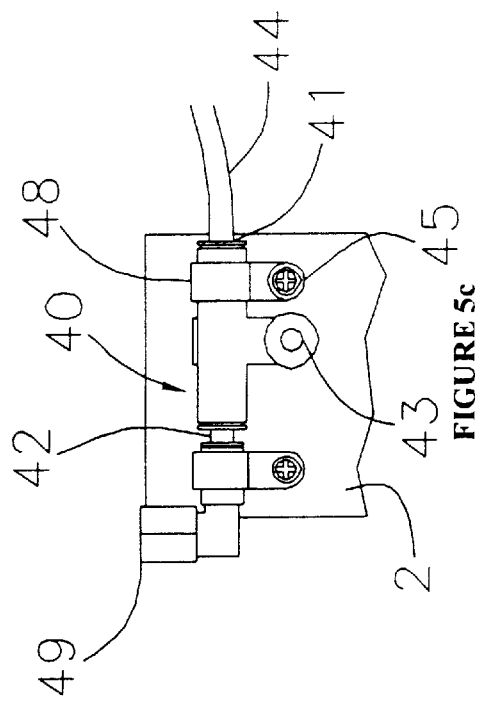
FIGURE 5a
FIGURE 5c
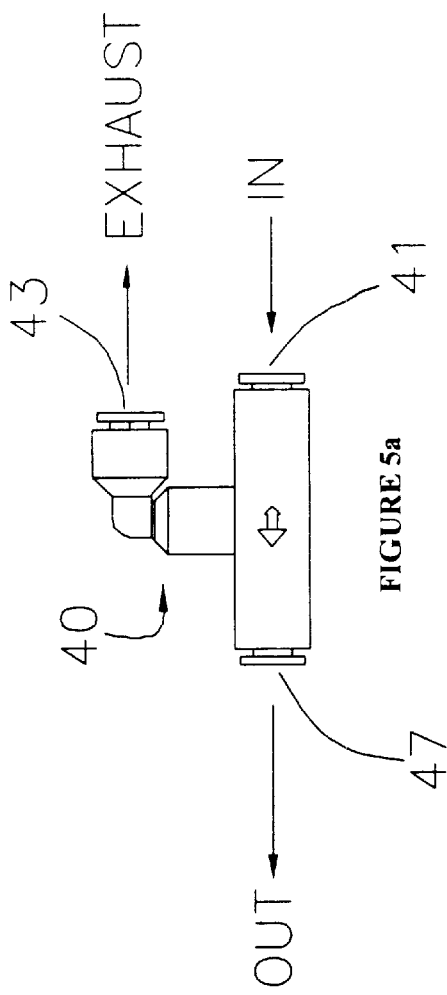
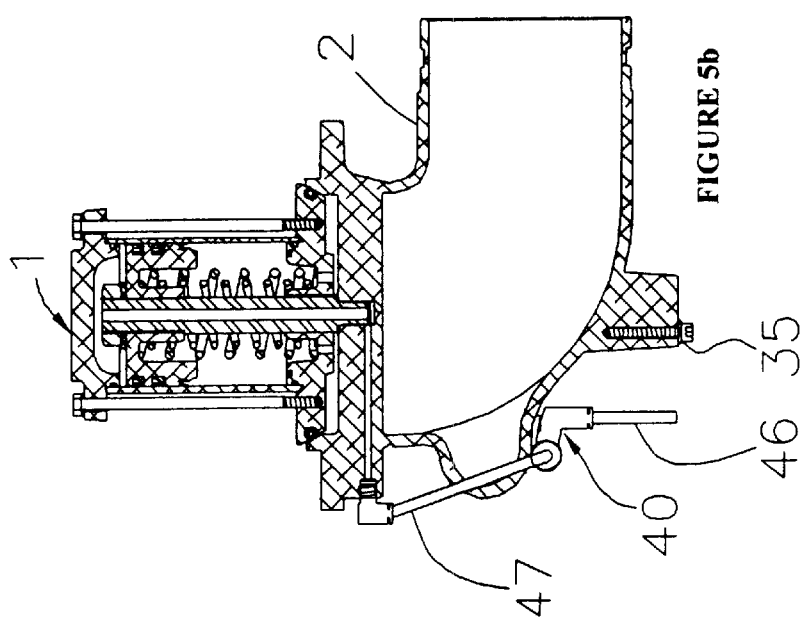
FIGURE 5b
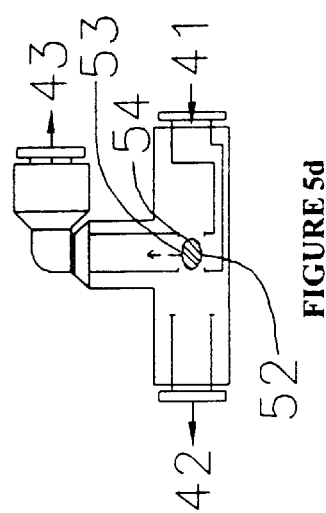
FIGURE 5d

AIR ACTIVATED INTERNAL VALVE

FIELD OF THE INVENTION

This invention relates generally to valves for cargo tanks, and more particularly, to a high flow internal valves positioned substantially within the interior of a cargo tank.

DESCRIPTION OF THE RELATED ART

Internal or emergency valves for liquid cargo tanks are known in the art. Examples of such valves are illustrated in U.S. Pat. Nos. 4,934,403 and 5,244,181, which are incorporated by reference herein. Internal valves are typically position in the bottom interior of the cargo tank and are designed for connection with a "wet line" which allows bottom loading and unloading of the cargo tank. As seen in U.S. Pat. No. 5,244,181, these internal valves have a main fluid flow passage through the valve. A rib extends across the fluid flow section but does not significantly disrupt the flow. A circular valve seat is formed around the entrance of the flow passage. A valve stem extends upwardly from the rib and a circular valve disk, which mates with and forms a seal with the valve seat, is slidingly mounted on the valve stem. When the valve disk is resting against the valve seat, the valve is closed. However, when the valve disk is lifted, such as by a mechanical lever as in U.S. Pat. No. 5,244,181, fluid can exit the cargo container through the flow passage.

While internal valves such as seen in U.S. Pat. No. 5,244,181 have served their purpose, there are many improvements which may be made. It would be advantageous to provide an internal valve which could be activated by a pressurized air source such as typically found on vehicles used to transport the cargo containers. It would also be advantageous to provide a manner of insuring gasoline or gasoline vapors did not migrate from the internal valve to the pressurized air system of the transport vehicle. Moreover, it would be an improvement in the art to provide a simple and reliable backup method of opening valve I in case the primary opening mechanism failed.

SUMMARY OF THE INVENTION

The present invention provides an air actuated internal valve for a cargo container. The valve generally comprises a valve base having a valve disk seat and a line connector extending therefrom. A valve stem having a first end is fixed to the valve base and a valve disk is slidingly mounted on the valve stem. A cylinder assembly is connected to the valve disk and a piston is positioned within the cylinder assembly and fixed to a second end of the valve stem. An air passage communicates through the base and the valve stem in order to provide air to an air space between the piston and a top internal portion of the cylinder assembly. When pressurized air is introduced into the air passage, the cylinder assembly (and thus the valve disk) moves upward, unseating the valve disk from the valve seat. This opens the valve and allows fluid to flow there through.

BRIEF DESCRIPTION OF THE DRAWINGS

FIGS. 5a–5d are selected views of the exhaust valve assembly of the present invention.

DETAILED DESCRIPTION OF THE INVENTION

Figure 1:
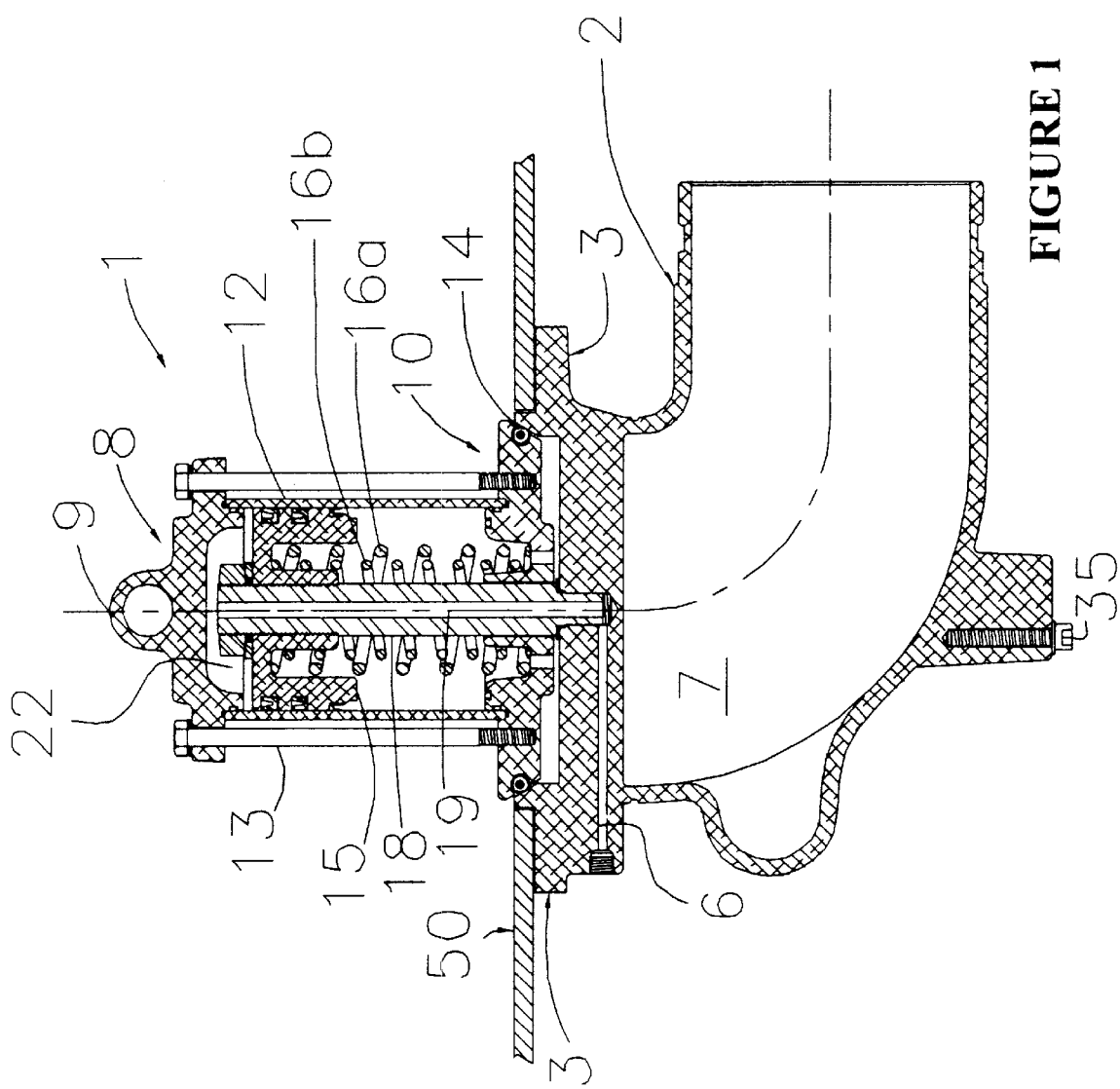
FIG. 1 is a cross sectional view of the valve of the present invention while the valve is in the closed position.
Figure 2:
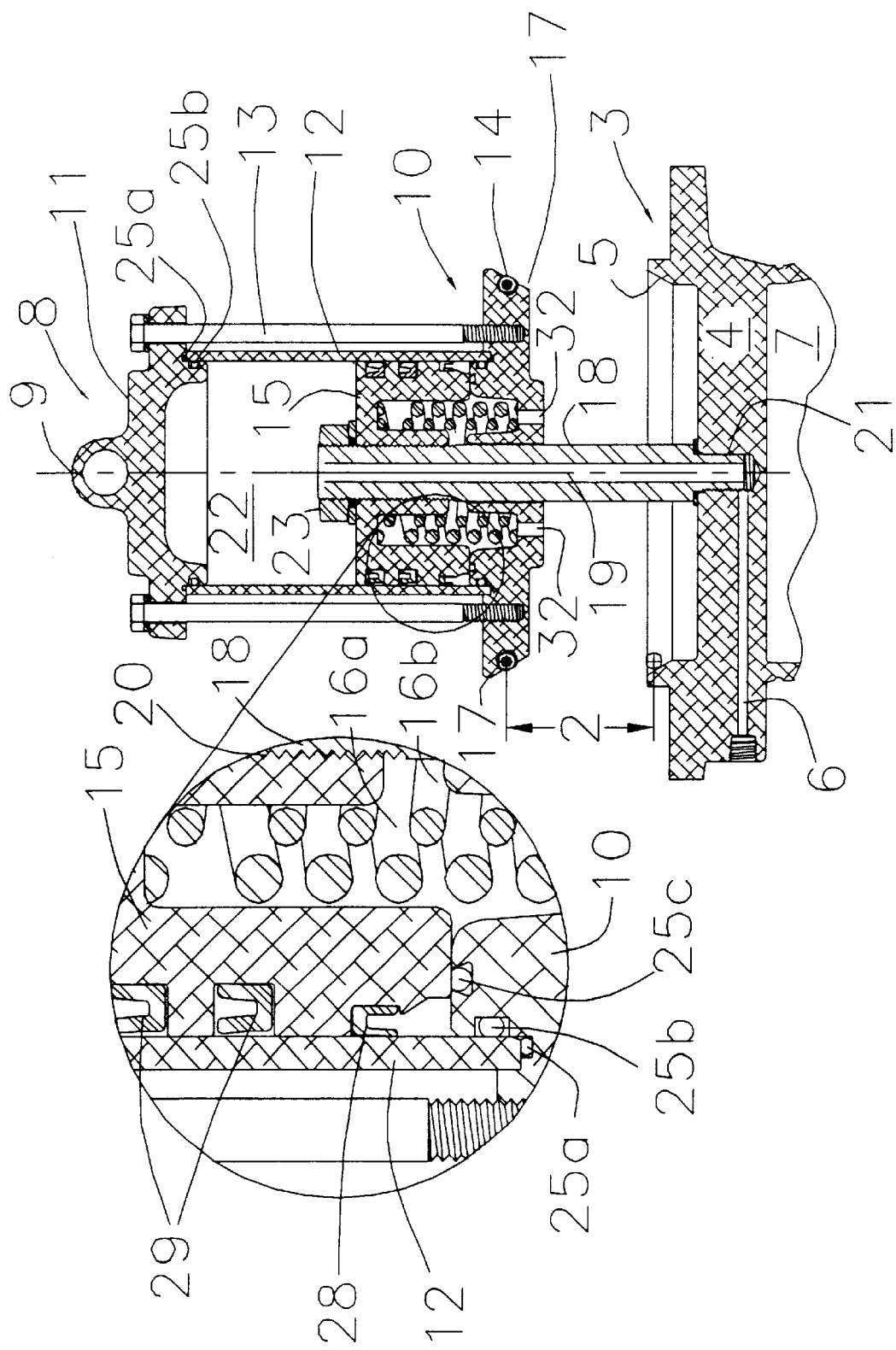
FIG. 2 is the same view as FIG. 1 but with the valve in the open position.
Figure 4:
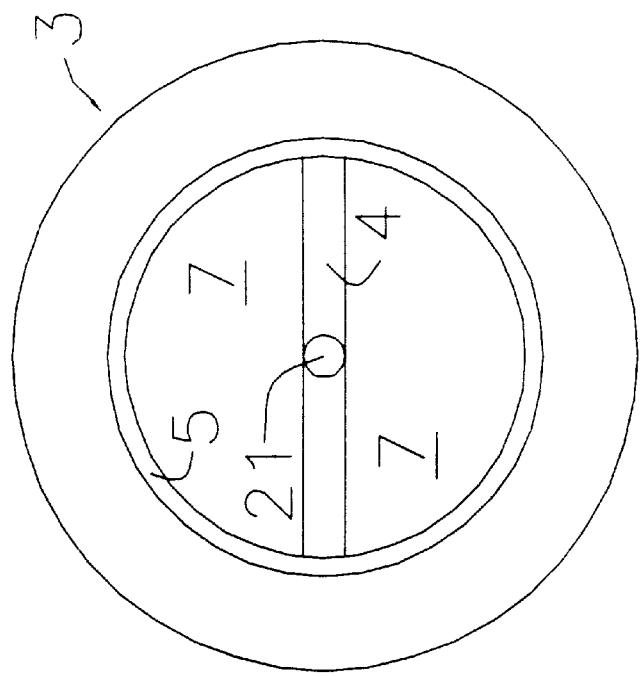
FIG. 4 is a top view of the valve base of the present invention.

FIG. 1 is a cross-sectional illustration of internal valve 1 of the present invention. While not explicitly shown in the drawings, it will be understood that several components of valve 1 take on a rounded or annular shape. Valve 1 will connect to a sump 50 formed in the bottom wall of a conventional cargo container. A line connector or an elbow connector 2 will extend from valve 1 with the end of elbow connector 2 being adapted for attachment to a conventional wet line. Valve 1generally comprises a valve base 3, a valve stem 18, a valve disk 10, a cylinder assembly 8, and a piston 15. As more clearly seen in FIG. 2, valve base 3 will have a valve seat 5 which mates with a lip 17 on valve disk 10. A conventional gasket such as O-ring 14 will be positioned on lip 17 to form a seal between valve seat 5 and valve disk 10 when valve 1 is in the closed position seen in FIG. 1. Base 3 will also include a rib section 4 positioned below valve seat 5. Viewing FIG. 4, it is seen that rib section 4 will not substantially block fluid passageway 7 formed through base 3. Returning to FIG. 2, stem 18 will be secured in threaded aperture 21 formed in rib section 4. Valve disk 10 will have an aperture through its center which allows valve disk 10 to slide on stem 18 between the two extremes seen in FIGS. 1 and 2. The cylinder assembly 8 will include cylinder body 12 positioned upon valve disk 10, a cylinder cap 11 positioned on cylinder body 12 and a plurality of cylinder bolts 13 which hold cylinder body 12, cylinder cap 11, and valve disk 10 together as a single unit. Cylinder cap 11 also has a manual-opening ring 9 which will be used to hook and lift cap 11 if internal valve 1 cannot be air activated as described below. As best seen in the enlarged insert of FIG. 2, a pair of O-rings 25a and 25b will form a double seal between cylinder body 12 and valve disk 10. The same double seal arrangement is employed between cylinder body 12 and cylinder cap 11. A piston 15 will be fixed to the upper end of stem 18 by way of threads 20 and a stem nut 23. An air space 22 is formed between piston 15 and the top internal surface of cylinder cap 11. Positioned between piston 15 and valve disk 10 will be a biasing device such as the two springs 16a and 16b. The springs 16a and 16b are shown wound in opposite directions to help prevent the coils from becoming lodged in one another. Another double seal system will be formed between the internal walls of cylinder body 12 and piston 15. The insert of FIG. 2 shows two conventional elastomer u-cup seals 29 and a single conventional teflon "energized" u-cup seal 28. The elastomer u-cup seals may be made of any polymer material such buna or a similar rubber-like material. U-cup seals 29 are intended to prevent the escape of air around and past piston 15 from air space 22. U-cup seal 28 is energized in the sense that it is formed of spring steel which has been coated with teflon. U-cup seal 28 is intended to prevent fluid from flowing past piston 15 and entering air space 22.

An air passage 6 is formed through rib section 4 and communicates with an air passage 19, which traverses through stem 18 to communicate with air space 22. While not explicitly shown in the figures, air passage 6 will normally be connected to an airline extending from a source of pressurized air carried on the vehicle transporting the cargo container in which valve 1 is positioned. Passages 32 formed in disk 10 will allow air and/or fluid to flow freely into and out of the internal piston space occupied by springs 16a and 16b. Passages 32 are intended to prevent pressure differentials in this internal piston space from retarding the movement of cylinder assembly 8 relative to piston 15.

FIG. 1 illustrates how internal valve 1 will be biased in the closed state. Springs 16a and 16b will seek to expand between piston 15 and valve disk 10. Since piston 15 is fixed on stem 18, valve disk 10 will tend to slide down stem 18 until it comes to rest against valve seat 5. When it is desired to open internal valve 1, pressurized air will be introduced into air passage 6 and will flow into air space 22. With piston 15 fixed, the air pressure acting on the upper internal surface of cylinder cap 11 will lift cap 11, compress springs 16a and 16b, and lift the attached valve disk 10 away from valve seat 5 as seen in FIG. 2. When air pressure is removed from air passage 6 and no net upward force is acting on the internal surface of cylinder cap 11, springs 16a and 16b will again move valve disk 10 into contact with valve seat 5 and close internal valve 1.

While u-cup seal 28 described above is intended to keep fluid (such as gasoline) which is being transported in the cargo container from entering into air space 22, it is not uncommon for some gasoline to leak into air space 22. When valve 1 transitions from the open position to the closed position, air (and any trapped gasoline) will be forced through the air passages and carried back into the air line connected to passage 6. In this manner, gasoline or gas vapor could work its way back into the transporting vehicle's compressed air system. This could create a potential fire or explosion hazard and may cause corrosive damage to the internal parts of the vehicle's compressed air system. To prevent the migration of gasoline into the compressed air system, the present invention provides an exhaust valve as seen in FIGS. 5a–5d.

FIG. 5a shows an exhaust valve 40 which has a pressurized air inlet 41, a pressurized air outlet 42, and an exhaust port 43. FIG. 5d is a simplified internal schematic of exhaust valve 40. It can be seen that air inlet 41 leads to a high pressure poppet seat 52 and that an exhaust poppet seat 53 is formed in the passage leading to exhaust port 43. It will be understood that poppet 54 is biased against poppet seat 52. However, when high pressure air enters inlet 41, poppet 54 is pushed against poppet seat 53, thus closing off the passage to exhaust port 43 and allowing air to only flow through air outlet 42. When the air supply to inlet 41 is cut off, poppet 54 returns to its biased position against poppet seat 52. Whatever air (or gasoline) which flows back into outlet 42 will now be directed into the passage leading to exhaust port 43. In this manner, gasoline is never allowed to pass back though air inlet 41.

FIG. 5b shows exhaust valve 40 mounted to elbow connector 2 and an exhaust line 46 extending from exhaust port 43. FIG. 5c illustrates in more detail how exhaust valve 40 will be mounted by way of valve clamps 48 gripping exhaust valve 40 while clamps 48 are secured to elbow connector 2 by mounting screws 45. Air hose 44 will direct pressurized air to inlet 41 and a conventional connector 49 will be connected to outlet 42.

Figure 3:
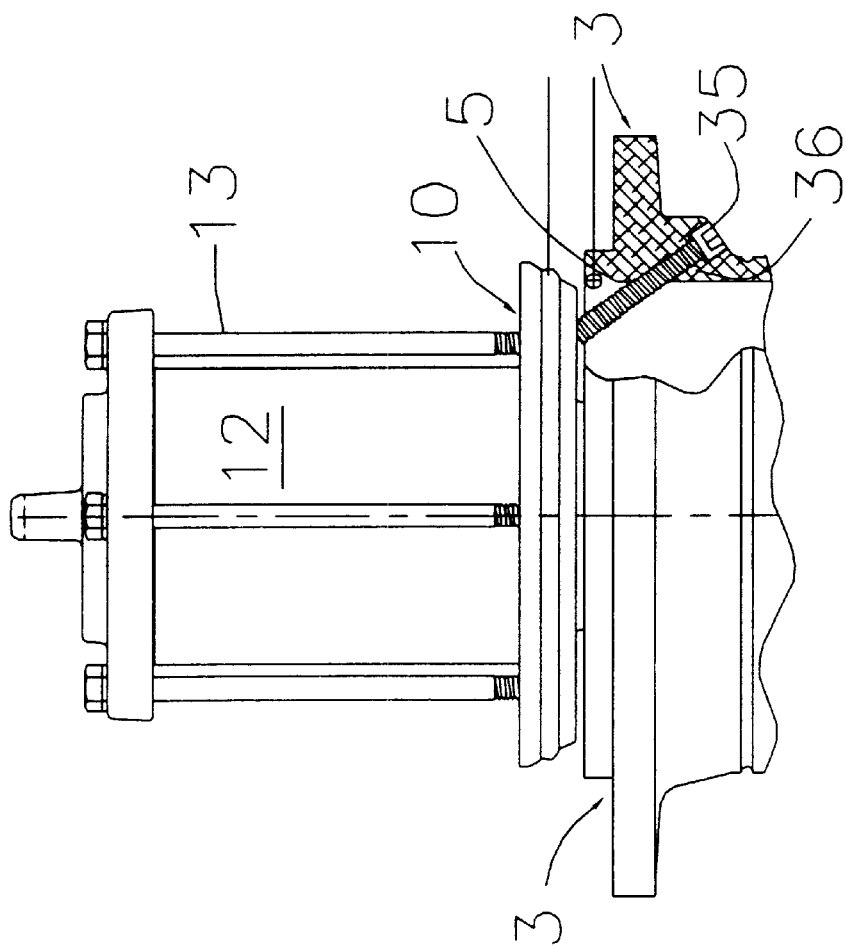
FIG. 3 is a view of the valve of the present invention being activated by a novel disk blocking screw.

Another novel feature of internal valve 1 is the disk blocking screw 35 as seen in FIG. 3. There may be instances where pressurized air is not available or cannot otherwise be used to open valve 1. In such a situation, disk blocking screw 35 may be inserted into a threaded access aperture 36 and advanced until blocking screw 35 pushes valve disk 10 into the open position. Blocking screw 35 is then removed to allow valve 1 to close again. While not show in the figures, a shorter plug screw will be inserted into access aperture 36 when blocking screw 35 is not in use. It will be understood that the plug screw prevents fluid from escaping from aperture 36, but is sufficiently short that it does not contact and move valve disk 10 away from valve seat 5. FIG. 1 also illustrates how blocking screw 35 will be stored when not in use in another threaded aperture at the bottom of elbow connector 2.

Although certain preferred embodiments have been described above, it will be appreciated by those skilled in the art to which the present invention pertains that modifications, changes, and improvements may be made without departing from the spirit of the invention as defined by the claims. All such modifications, changes, and improvements are intended to come within the scope of the present invention.

I claim:

1. An air actuated internal valve for a cargo tank, said valve comprising:
   a. a valve base having a valve disk seat and a line connector extending therefrom;
   b. a valve stem having a first end fixed to said valve base;
   c. a valve disk slidingly mounted on said valve stem;
   d. a cylinder assembly connected to said valve disk;
   e. a piston positioned within said cylinder assembly and fixed to a second end of said valve stem;
   f. an air passage communicating through said base and said valve stem in order to provide air to an air space between said piston and a top internal portion of said cylinder assembly; and
   g. a fluid exhaust valve connected to said air passage and directing air from an air supply line to said air passage, said fluid exhaust valve further having a check valve structure directing return air or fluid from said air passage to an exhaust line wherein said check valve structure substantially seals said supply line from fluid and/or vapor returning from said internal valve and allows said fluid and/or vapor to exit through said exhaust valve.

2. An air actuated internal valve according to claim 1, said valve further comprising a biasing device positioned between said valve disk and said piston.

3. An air actuated internal valve according to claim 1, said valve further comprising a valve disk blocking screw engaging said valve disk in order to hold said valve disk in an open position.

4. An air actuated internal valve according to claim 1, said valve further comprising a double seal between said piston and said cylinder assembly, said double seal including an energized seal and a elastomer seal.

5. An air actuated internal valve according to claim 2, wherein said biasing device is a double spring.

* * * * *